United States Patent
Park et al.

(10) Patent No.: US 7,133,103 B2
(45) Date of Patent: Nov. 7, 2006

(54) IN-PLANE SWITCHING LIQUID CRYSTAL DISPLAY DEVICE AND MANUFACTURING METHOD OF THE SAME

(75) Inventors: Jong-Jin Park, Seoul (KR); Woong-Kwon Kim, Gunpo-si (KR)

(73) Assignee: LG.Philips LCD Co., Ltd., Seoul (KR)

( * ) Notice: Subject to any disclaimer, the term of this patent is extended or adjusted under 35 U.S.C. 154(b) by 33 days.

(21) Appl. No.: 10/878,309

(22) Filed: Jun. 29, 2004

(65) Prior Publication Data

US 2005/0134783 A1  Jun. 23, 2005

(30) Foreign Application Priority Data

Dec. 23, 2003  (KR) .................. 10-2003-0095715

(51) Int. Cl.
*G02F 1/1343* (2006.01)
(52) U.S. Cl. ...................................... 349/141
(58) Field of Classification Search ................. 349/141
See application file for complete search history.

(56) References Cited

U.S. PATENT DOCUMENTS

| | | | |
|---|---|---|---|
| 2001/0048500 A1* | 12/2001 | Lim et al. ................ | 349/141 |
| 2003/0086045 A1* | 5/2003 | Ono et al. ............... | 349/141 |
| 2003/0117558 A1* | 6/2003 | Kim et al. ............... | 349/141 |
| 2004/0080700 A1* | 4/2004 | Kang ..................... | 349/141 |
| 2004/0183976 A1* | 9/2004 | Nagano et al. ........... | 349/141 |

* cited by examiner

*Primary Examiner*—James Dudek
(74) *Attorney, Agent, or Firm*—McKenna Long & Aldridge LLP

(57) ABSTRACT

An in-plane switching liquid crystal display device includes a substrate, a gate line and a data line on the substrate, wherein the gate and data lines cross each other to define a pixel region, a thin film transistor electrically connected to the gate and data lines, a pixel electrode connected to the thin film transistor, a common line parallel to the gate line, and a common electrode connected to the common line and parallel to the pixel electrode, wherein the common line is adjacent to the gate line, and the gate line has first concavities at a side facing the common line.

18 Claims, 4 Drawing Sheets

IN-PLANE SWITCHING LIQUID CRYSTAL DISPLAY DEVICE AND MANUFACTURING METHOD OF THE SAME

This application claims the benefit of Korean Patent Application No. 2003-0095715, filed on Dec. 23, 2003, which is hereby incorporated by reference for all purposes as if fully set forth herein.

BACKGROUND OF THE INVENTION

1. Field of the Invention

The present invention relates to a liquid crystal display (LCD) device. More particularly, the present invention relates to an in-plane switching liquid crystal display (IPS LCD) device and a method of manufacturing the same.

2. Discussion of the Related Art

A liquid crystal display device uses the optical anisotropy and polarization properties of liquid crystal molecules to produce an image. Liquid crystal molecules have a definite orientational alignment as a result of their long, thin shapes. The alignment direction can be controlled by an applied electric field. Specifically, as an applied electric field changes, so does the alignment of the liquid crystal molecules. Due to the optical anisotropy, the refraction of incident light depends on the alignment direction of the liquid crystal molecules. Thus, by properly controlling an applied electric field, a desired light image can be produced.

An electric field is induced by a voltage difference between a pixel electrode and a common electrode. An in-plane switching IPS LCD device having the pixel electrode and the common electrode on the same substrate has been widely developed and used because the IPS LCD device has a wide viewing angle. A detailed explanation of a related art IPS LCD device and its operation modes will be provided with reference to the following figures.

FIGS. 1A and 1B are cross-sectional views of an IPS LCD device according to the related art, and illustrate operations of liquid crystal molecules for the IPS mode in OFF and ON states.

As shown in the figures, first and second substrates 10 and 60 are spaced apart from and face each other. A pixel electrode 40 and a common electrode 45 are formed on the first substrate 10. Liquid crystal molecules 52 of a liquid crystal layer 50 are arranged along a lateral electric field, which is parallel to the first and second substrates 10 and 60, and induced between the pixel electrode 40 and the common electrode 45.

FIG. 1A conceptually illustrates an OFF state operation mode for the related art IPS LCD device. In the OFF state, because there is no electric field between the two electrodes 40 and 45, the liquid crystal molecules 52 maintain an initial arrangement according to an alignment layer, which is made by a method such as a rubbing. Thus, the long axes of the liquid crystal molecules 52 are parallel to the common and pixel electrodes 40 and 45 on the first substrate 10.

FIG. 1B conceptually illustrates an ON state operation mode for the related art IPS LCD device. In the ON state, a lateral electric field 56 parallel to the first and second substrates 10 and 60 is generated between the pixel and common electrodes 40 and 45. Thus, the liquid crystal molecules 52b between the pixel and common electrodes 40 and 45 are aligned such that long axes thereof are parallel to the substrates 10 and 60 and perpendicular to the pixel and common electrodes 40 and 45, while the liquid crystal molecules 52a over the pixel and common electrodes 40 and 45 maintain an initial arrangement e.g., parallel to the pixel and common electrodes 40 and 45 because an electric field vertical to the substrates 10 and 60 is induced over the pixel and common electrodes 40 and 45.

As stated above, the IPS LCD device uses the lateral electric field that results from the pixel and common electrodes 40 and 45 being formed on the same substrate, e.g., the first substrate 10. The IPS LCD device has a wide viewing angle and low color dispersion.

FIG. 2 is a plan view of a related art in-plane switching liquid crystal display (IPS LCD) device. As illustrated in FIG. 2, gate lines 120 are formed horizontally in the context of the figure, and data lines 130 extend vertically in the context of the figure. The gate and data lines 120 and 130 cross each other to define a pixel region. A thin film transistor T is connected to the gate line 120 and the data line 130 as a switching element. A pixel electrode 140 is connected to the thin film transistor T, and a common electrode 145 for generating a lateral electric field with the pixel electrode 140 is also formed. The common electrode 145 is connected to a common line 147, which is parallel to the gate line 120.

The gate line 120 and the data line 130 are connected to a gate pad 125 and a data pad 135, respectively. The gate pad 125 and the data pad 135 are connected to outer gate and data driver integrated circuits (not shown), and receive scanning and video signals from the gate and data driver integrated circuits, respectively. Thus, the scanning signals are applied to the gate line 120 through the gate pad 125 and the video signals are applied to the data line 130 through the data pad 135.

The thin film transistor T includes a gate electrode 121 extending from the gate line 120, a semiconductor layer 115 over the gate electrode 121, a source electrode 131 extending from the data line 130 and overlapping the semiconductor layer 115, and a drain electrode 133 spaced apart from the source electrode 131. The thin film transistor T turns ON/OFF depending on the scanning signals transmitted to the gate electrode 121, and when the thin film transistor T turns ON, the video signals are transmitted from the source electrode 131 to the drain electrode 133.

The pixel electrode 140 is connected to the drain electrode 133, and the common electrode 145 is parallel to the pixel electrode 140. The common electrode 145 alternates with the pixel electrode 140. Additionally, the common electrode 145 is connected to the common line 147 through a contact hole 149, and thus receives common signals.

The common line 147 is adjacent to a previous gate line 120, and is formed through the same process as the gate line 120. That is, a metal layer is deposited on a substrate and then is patterned to thereby form the gate line 120 and the common line 147. The adjacent common and gate lines 147 and 120 have a distance of about 10 µm therebetween.

To form the gate and common lines 120 and 147, an etching process using an etchant is performed. During the etching process, an electrical short may occur between the adjacent gate line 120 and common line 147 due to fine residues. For example, if the adjacent common and gate lines are spaced apart with a distance of 8 µm to 12 µm, 20~60% may be electrically shorted.

SUMMARY OF THE INVENTION

Accordingly, the present invention is directed to an in-plane switching liquid crystal display (IPS LCD) device and a manufacturing method of the same that substantially obviates one or more of the problems due to limitations and disadvantages of the related art.

An advantage of the present invention is to provide an in-plane switching liquid crystal display device without an electrical short between electrical lines.

Another advantage of the present invention is to provide a manufacturing method for an in-plane switching liquid crystal display device that prevents electrical lines from being electrically shorted.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the present invention, as embodied and broadly described, an in-plane switching liquid crystal display device includes a substrate, a gate line and a data line on the substrate, wherein the gate and data lines cross each other to define a pixel region, a thin film transistor electrically connected to the gate and data lines, a pixel electrode connected to the thin film transistor, a common line parallel to the gate line, and a common electrode connected to the common line and parallel to the pixel electrode, wherein the common line is adjacent to the gate line, and the gate line has first concavities at a side facing the common line.

In another aspect, an in-plane switching liquid crystal display device includes a substrate, a plurality of gate lines having a first direction on the substrate, a plurality of data lines having a second direction and crossing the gate lines, a thin film transistor electrically connected to the gate and data lines, a pixel electrode connected to the thin film transistor, a common line parallel to the gate lines and disposed between a (2n−1)th gate line and a 2nth gate line, where n is a natural number, and a common electrode connected to the common line and parallel to the pixel electrode, wherein the 2nth gate line is near a (2n+1)th gate line, and the 2nth gate line has first concavities at a side facing the (2n+1)th gate line.

In another aspect, a method of manufacturing an in-plane switching liquid crystal display device includes forming a gate line having a first direction on a substrate, forming a data line having a second direction and crossing the gate line, forming a thin film transistor connected to the gate and data lines, forming a pixel electrode connected to the thin film transistor, forming a common line parallel to the gate line, and forming a common electrode connected to the common line and parallel to the pixel electrode, wherein the common line is adjacent to the gate line, the gate line and the common line having first concavities and second concavities at sides facing each other, respectively.

In another aspect, a method of manufacturing an in-plane switching liquid crystal display device includes forming a plurality of gate lines having a first direction on a substrate, forming a plurality of data lines having a second direction and crossing the plurality of gate lines, forming a thin film transistor that is electrically connected to the gate and data lines, forming a pixel electrode connected to the thin film transistor, forming a common line parallel to the gate lines and disposed between a (2n−1)th gate line and a 2nth gate line, where n is a natural number, and forming a common electrode connected to the common line and parallel to the pixel electrode, wherein the 2nth gate line is near a (2n+1)th gate line, the 2nth gate line and the (2n+1)th gate line having first and second concavities at sides facing each other, respectively.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate, embodiments of the invention and together with the description serve to explain the principles of the invention. In the drawings.

DETAILED DESCRIPTION OF THE ILLUSTRATED EMBODIMENTS

Reference will now be made in detail to the illustrated embodiments of the present invention, which are illustrated in the accompanying drawings.

Figure 1A:
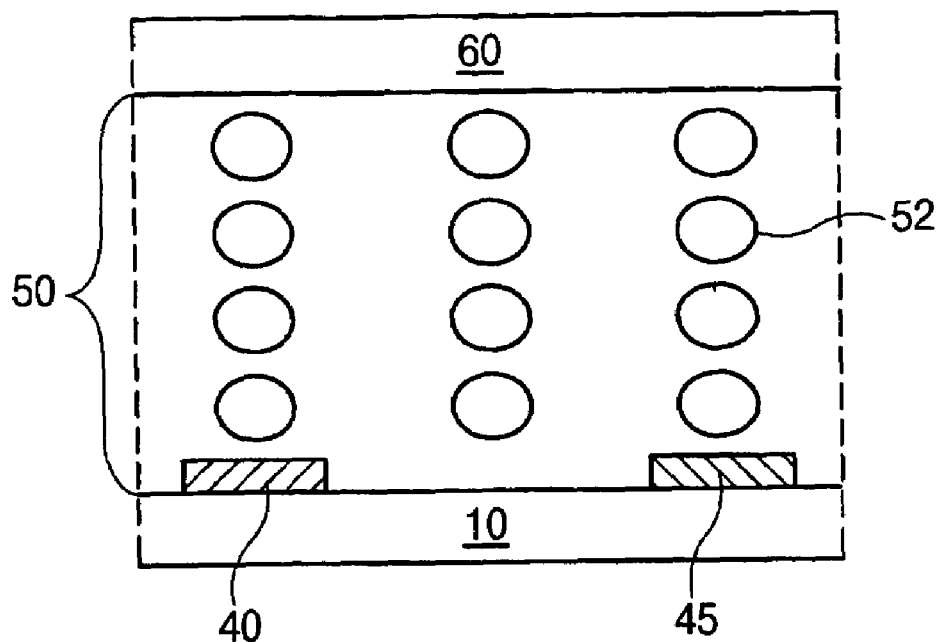
FIGS. 1A and 1B are cross-sectional views of an IPS LCD device according to the related art.
Figure 1B:
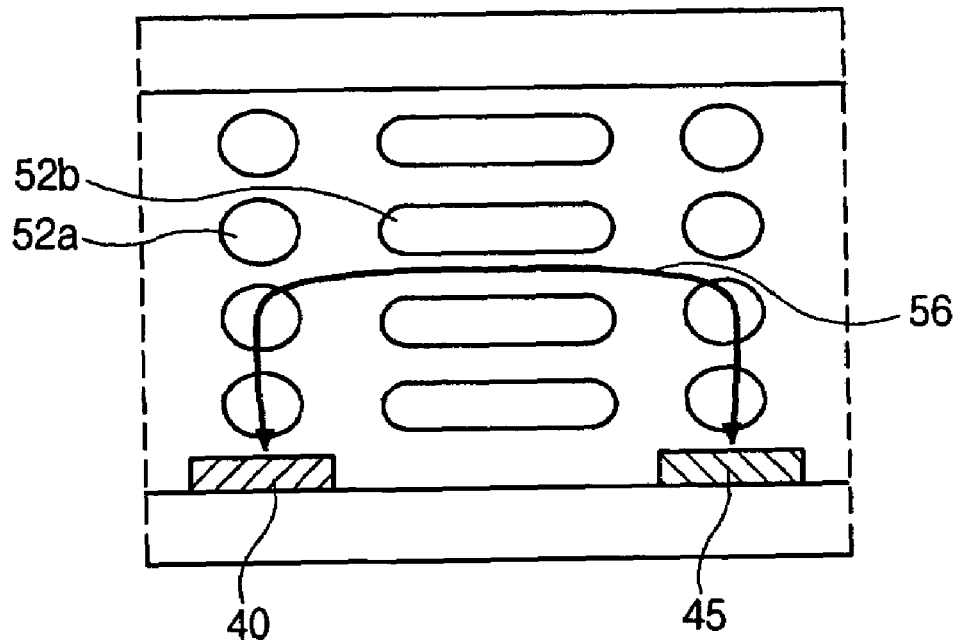
Figure 2:
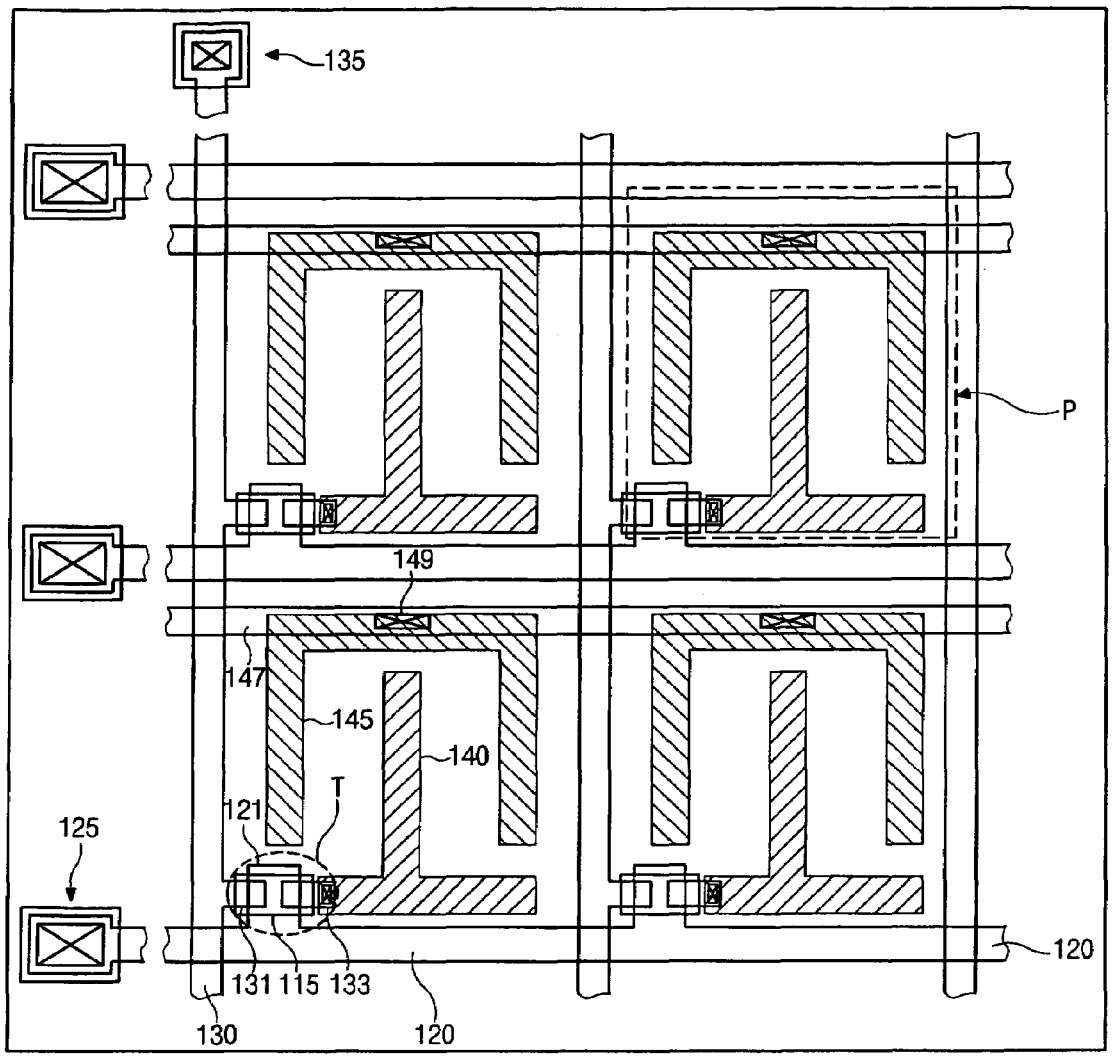
FIG. 2 is a plan view of a related art IPS LCD device.
Figure 3:
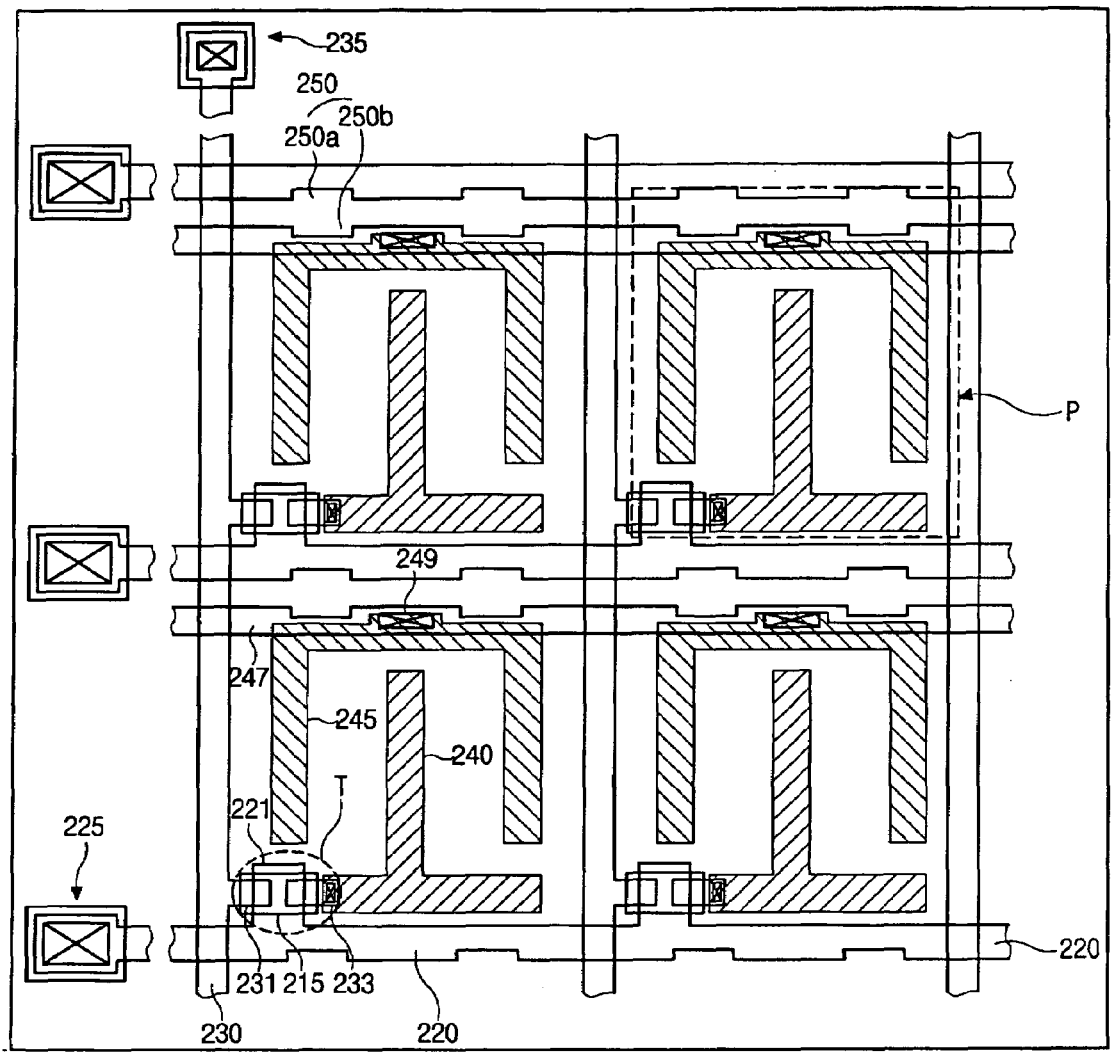
FIG. 3 is a plan view of an in-plane switching liquid crystal display (IPS LCD) device according to a first embodiment of the present invention.

FIG. 3 is a plan view of an in-plane switching liquid crystal display (IPS LCD) device according to a first embodiment of the present invention. In the first embodiment, adjacent gate line and common lines have concavities at their facing sides. Thus, electrically shorting problems between the adjacent gate and common lines may be solved during an etching process.

As shown in FIG. 3, a gate line 220 is formed horizontally in the context of the figure, and a data line 230 is formed vertically in the context of the figure. The gate line 220 and the data line 230 cross each other to define a pixel region. A thin film transistor T is connected to the gate and data lines 220 and 230 as a switching element. A pixel electrode 240 and a common electrode 245 for forming a lateral electric field are formed in the pixel region. The pixel electrode 240 is connected to the thin film transistor T, and the common electrode 245 is connected to a common line 247, which is parallel to the gate line 220.

The gate line 220 and the data line 230 are connected to a gate pad 225 and a data pad 235 disposed at ends thereof, respectively. The gate pad 225 and the data pad 235 are connected to outer gate and data driver integrated circuits (not shown), and receive scanning and video signals from the gate and data driver integrated circuits, respectively. Thus, the scanning signals are applied to the gate line 220 through the gate pad 225 and the video signals are applied to the data line 230 through the data pad 235.

The thin film transistor T includes a gate electrode 221, a semiconductor layer 215, a source electrode 231 and a drain electrode 233. The gate electrode 221 extends vertically from the gate line 220. The semiconductor layer 215 overlaps the gate electrode 221, and more particularly, is formed over the gate electrode 221. The source electrode 231 extends horizontally from the data line 230, and overlaps the semiconductor layer 215 and the gate electrode 221. The drain electrode 233 overlaps the semiconductor layer 215 and the gate electrode 221, and is spaced apart from the source electrode 231 over the gate electrode 221.

The thin film transistor T turns ON/OFF depending on the scanning signals transmitted to the gate electrode 221. When the thin film transistor T turns ON, the video signals are transmitted from the source electrode 231 to the drain electrode 233.

The pixel electrode 240 is connected to the drain electrode 233. The pixel electrode 240 may be formed of a transparent conductive material such as indium tin oxide (ITO) and indium zinc oxide (IZO). At this time, a drain contact hole may be formed in an insulating layer to connect the pixel electrode 240 with the drain electrode 233. On the other hand, the pixel electrode 240 may be formed of the same material through the same process as the drain electrode 233, and thus the pixel electrode 240 has one body shape with the drain electrode 233.

The common electrode 245 is parallel to the pixel electrode 240, and alternates with the pixel electrode 240. The common electrode 245 may be formed of a transparent conductive material such as ITO and IZO. If the pixel electrode 240 may be formed of the transparent conductive material, the common electrode 245 may be formed through the same process as the pixel electrode 240. The common electrode 245 is connected to the common line 247 through a contact hole 249, and thus receives common signals through the common line 247.

The common electrode 245 may be formed of the same material and through the same process as the common line 247. Then, the common electrode 245 is directly connected to the common line 247 without the contact hole 249.

The common line 247 is adjacent to a previous gate line 220, and the adjacent common and gate lines 247 and 220 are spaced apart from each other with a distance of about 6 μm to about 14 μm therebetween. The common line 247 is formed of the same material and through the same process as the gate line 220. That is, a metal layer is deposited on a substrate and then is patterned to form the gate line 220 and the common line 247.

The common line 247 and the gate line 220 have concavities 250 at their facing sides. That is, the gate line 220 has first concavities 250a at a side facing the common line 247, and the common line 247 has second concavities 250b at a side facing the gate line 220. The first and second concavities 250a and 250b prevent the common line 247 and the gate line 220 adjacent to each other from being electrically shortened during an etching process of patterning the common line 247 and the gate line 220. The second concavities 250b correspond to the first concavities 250a.

As stated above, with respect to an IPS LCD device of the first embodiment of the present invention, an electrical short may be prevented by forming the concavities at the facing sides of the adjacent common and gate lines, even though fine residues are formed during the etching process.

Figure 4:
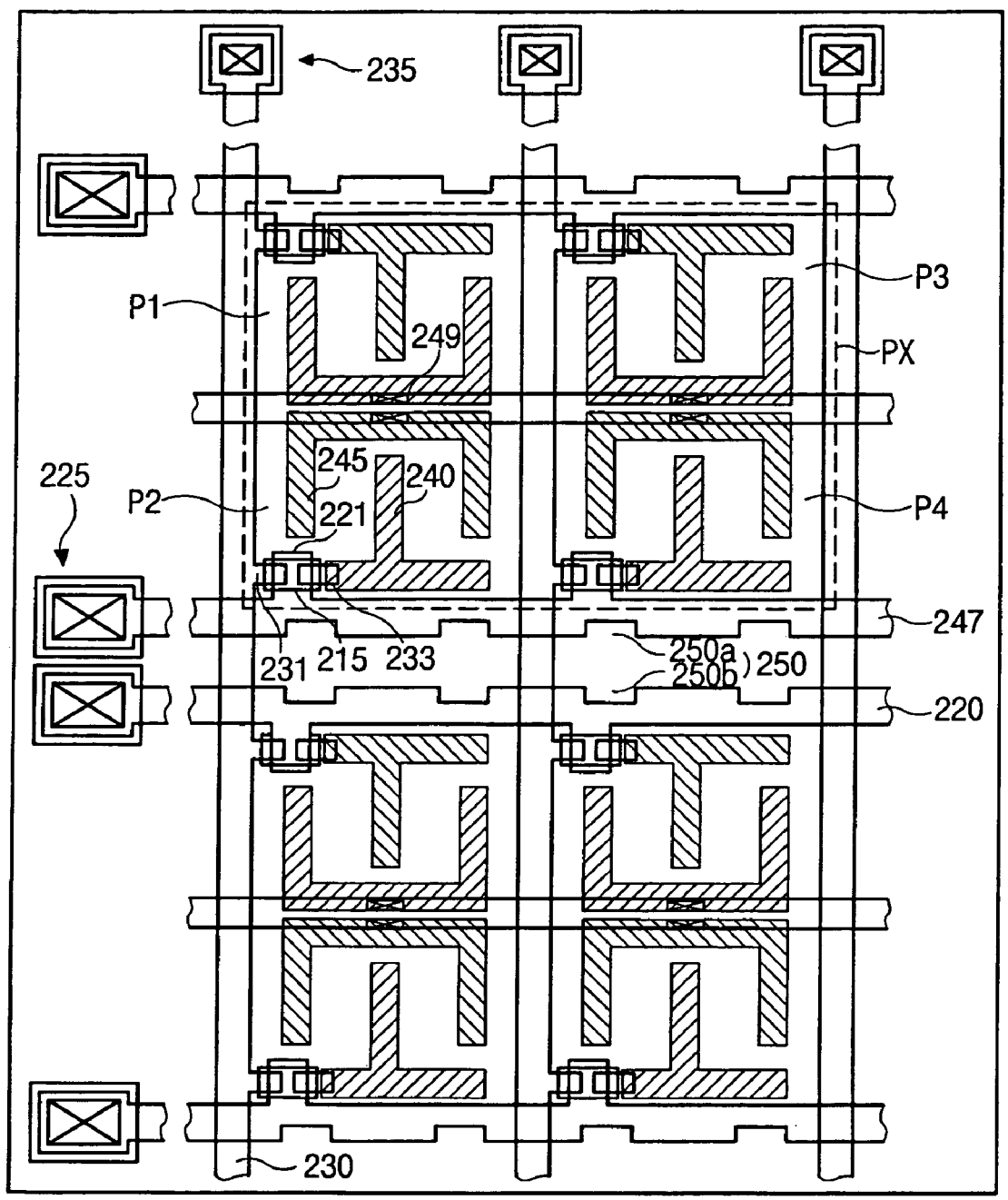
FIG. 4 is a plan view of an IPS LCD device according to a second embodiment of the present invention.

FIG. 4 is a plan view of an IPS LCD device according to a second embodiment of the present invention. Explanation for the same parts as the first embodiment may be omitted.

The IPS LCD device of the second embodiment is a quad type, in which one pixel includes four sub pixels. The sub pixels display red, green, blue and white colors, respectively. In the IPS LCD device, adjacent sub pixels in an up and down direction in the context of the figure share a common line. Thus, an aperture ratio is improved.

Additionally, in the second embodiment, neighboring gate lines have concavities at facing sides thereof to prevent an electrical short during an etching process of the gate lines.

As shown in FIG. 4, four sub pixels P1, P2, P3 and P4 form one pixel PX for an image. A common line 247 is formed between adjacent gate lines 220 to define the pixel PX. Thus, two sub pixels P1 and P2 or P3 and P4 in an up and down direction in the context of the figure commonly have the common line 247. The up-and-down sub pixels P1 and P2 or P3 or P4 of the pixel PX receive common signals from one common line 247.

In this embodiment, because two sub pixels P1 and P2 or P3 or P4 of the pixel PX share the common line 247, one gate line 220 of the pixel PX is vertically near a gate line 220 of the next pixel PX in the context of the figure. That is, a $2n^{th}$ even gate line is adjacent to a (2n+1)th odd gate line (where n is a natural number). The adjacent gate lines 220 have a space within a range of about 6 μm to 14 μm therebetween.

The adjacent gate lines 220 also include concavities 250 of respective sides facing each other. More particularly, the 2nth gate line 220 has first concavities 250a and the (2n+1)th gate line 220 has second concavities 250b. The first and second concavities 250a and 250b correspond to each other and prevent the adjacent gate lines 220 from being electrically shorted during the etching process forming the gate lines 220.

In the present invention, the concavities 250 may have various shapes.

In the quad type IPS LCD device according to the second embodiment of the present invention, formation of the concavities at the facing sides of the adjacent gate lines, even though fine residues are formed during the etching process, allows an electrical short to be prevented.

It will be apparent to those skilled in the art that various modifications and variations can be made in the fabrication and application of the present invention without departing from the spirit or scope of the invention. Thus, it is intended that the present invention cover the modifications and variations of this invention provided they come within the scope of the appended claims and their equivalents.

What is claimed is:

1. An in-plane switching liquid crystal display device, comprising:
   a substrate;
   a gate line and a data line on the substrate, wherein the gate and data lines cross each other to define a pixel region;
   a thin film transistor electrically connected to the gate and data lines;
   a pixel electrode connected to the thin film transistor;
   a common line parallel to the gate line; and
   a common electrode connected to the common line and parallel to the pixel electrode,
   wherein the common line is adjacent to the gate line, and the gate line has first concavities at a side facing the common line between adjacent data lines, and
   wherein the common line has second concavities at a side facing the gate line.

2. The device according to claim 1, wherein the second concavities correspond to the first concavities.

3. The device according to claim 1, wherein the common line is formed on a same layer as the gate line.

4. An in-plane switching liquid crystal display device, comprising:
   a substrate;
   a gate line and a data line on the substrate, wherein the gate and data lines cross each other to define a pixel region;
   a thin film transistor electrically connected to the gate and data lines;
   a pixel electrode connected to the thin film transistor;
   a common line parallel to the gate line; and a common electrode connected to the common line and parallel to the pixel electrode, wherein the common line is adjacent to the gate line, and the gate line has first concavities at a side facing the common line between adjacent data lines, and wherein the gate line and the common line are spaced apart from each other by a distance within a range of about 6 µm to 14 µm.

5. An in-plane switching liquid crystal display device, comprising:

a substrate;

a plurality of gate lines having a first direction on the substrate;

a plurality of data lines having a second direction and crossing the gate lines;

a thin film transistor electrically connected to the gate and data lines;

a pixel electrode connected to the thin film transistor;

a common line parallel to the gate lines and disposed between a (2n−1)th gate line and a 2nth gate line, where n is a natural number; and a common electrode connected to the common line and parallel to the pixel electrode, wherein the 2nth gate line is near a (2n+1)th gate line, and the 2nth gate line has first concavities at a side facing the (2n+1)th gate line between adjacent data lines, and wherein the (2n+1)th gate line has second concavities at a side facing the 2nth gate line.

6. The device according to claim 5, wherein the second concavities correspond to the first concavities.

7. The device according to claim 5, wherein the IPS LCD device is a quad type, wherein one pixel includes four sub pixels of red, green, blue and white color.

8. The device according to claim 7, wherein two of the sub pixels are adjacent to each other in the second direction and share the common line.

9. An in-plane switching liquid crystal display device, comprising:

a substrate;

a plurality of gate lines having a first direction on the substrate;

a plurality of data lines having a second direction and crossing the gate lines;

a thin film transistor electrically connected to the gate and data lines;

a pixel electrode connected to the thin film transistor;

a common line parallel to the gate lines and disposed between a (2n−1)th gate line and a 2nth gate line, where n is a natural number; and a common electrode connected to the common line and parallel to the pixel electrode, wherein the 2nth gate line is near a (2n+1)th gate line, and the 2nth gate line has first concavities at a side facing the (2n+1)th gate line between adjacent data lines, and wherein the 2nth gate line and the (2n+1)th gate line are spaced apart from each other by a distance within a range of about 6 µm to 14 µm.

10. A method of manufacturing an in-plane switching liquid crystal display device, comprising:

forming a gate line having a first direction on a substrate;

forming a data line having a second direction and crossing the gate line;

forming a thin film transistor connected to the gate and data lines;

forming a pixel electrode connected to the thin film transistor;

forming a common line parallel to the gate line; and forming a common electrode connected to the common line and parallel to the pixel electrode, wherein the common line is adjacent to the gate line, the gate line and the common line having first concavities and second concavities at sides facing each other, respectively.

11. The method according to claim 10, wherein the second concavities correspond to the first concavities.

12. The method according to claim 10, wherein forming the common line and forming the gate line are simultaneously performed.

13. The method according to claim 10, wherein the gate line and the common line are spaced apart from each other by a distance within a range of about 6 µm to 14 µm.

14. A method of manufacturing an in-plane switching liquid crystal display device, comprising:

forming a plurality of gate lines having a first direction on a substrate;

forming a plurality of data lines having a second direction and crossing the plurality of gate lines;

forming a thin film transistor that is electrically connected to the gate and data lines;

forming a pixel electrode connected to the thin film transistor;

forming a common line parallel to the gate lines and disposed between a (2n−1)th gate line and a 2nth gate line, where n is a natural number; and forming a common electrode connected to the common line and parallel to the pixel electrode, wherein the 2nth gate line is near a (2n+1)th gate line, the 2nth gate line and the (2n+1)th gate line having first and second concavities at sides facing each other between adjacent data lines, respectively.

15. The method according to claim 14, wherein the second concavities correspond to the first concavities.

16. The method according to claim 14, wherein the IPS LCD device is a quad type, wherein one pixel includes four sub pixels of red, green, blue and white colors.

17. The method according to claim 16, wherein two of the sub pixels adjacent to each other in the second direction share the common line.

18. The method according to claim 14, wherein the 2nth gate line and the (2n+1)th gate line are spaced apart from each other by a distance within a range of about 6 µm to 14 µm therebetween.

* * * * *